Feb. 20, 1934.  G. E. COX  1,947,971
METHOD OF GRANULATING CYANAMIDE
Filed April 27, 1932  2 Sheets-Sheet 2
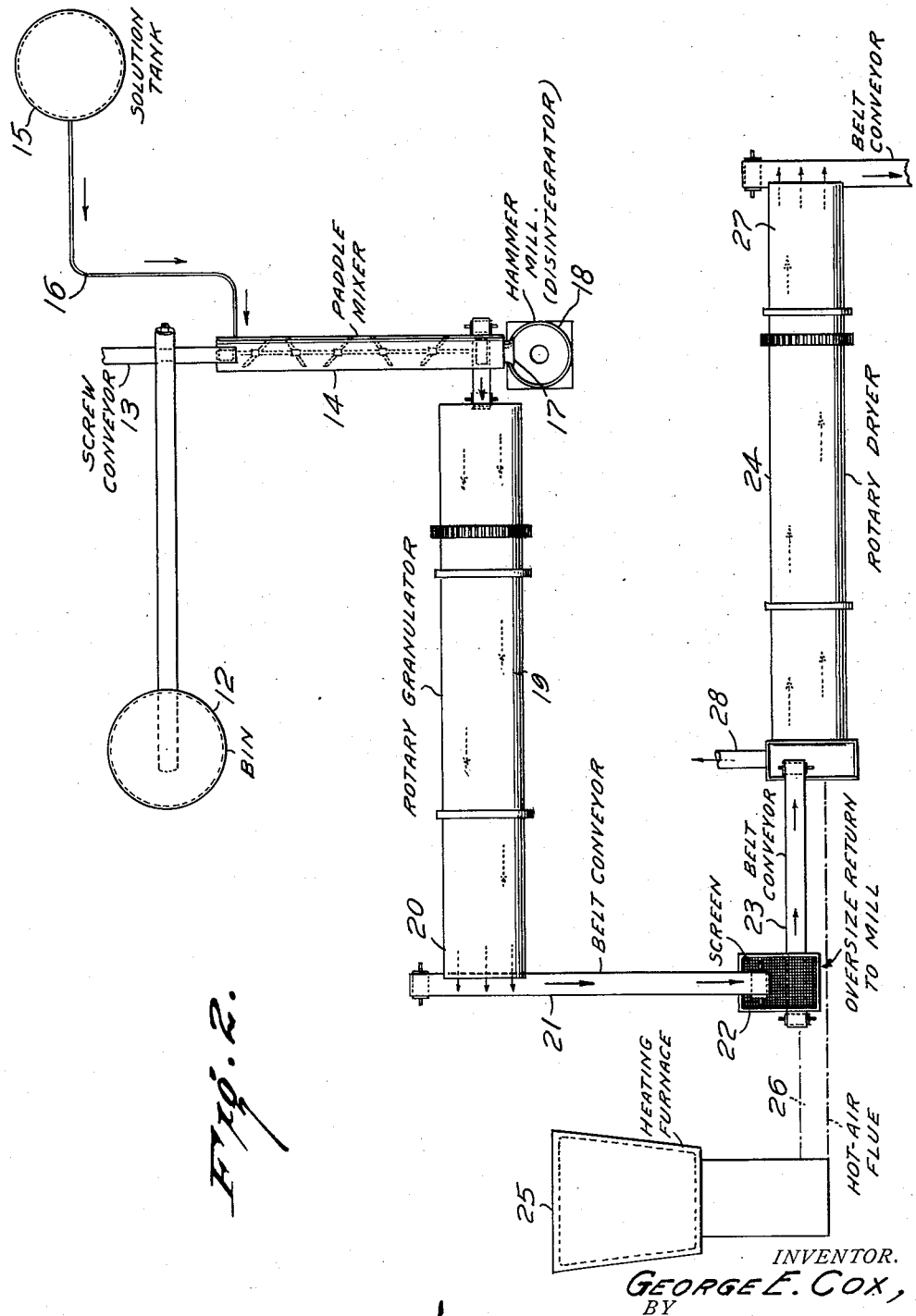

Patented Feb. 20, 1934

1,947,971

UNITED STATES PATENT OFFICE 1,947,971

METHOD OF GRANULATING CYANAMIDE

George E. Cox, Niagara Falls, N. Y., assignor to American Cyanamid Company, New York, N. Y., a corporation of Maine Application April 27, 1932. Serial No. 607,791

32 Claims. (Cl. 23—78)

This invention relates to the granulation of calcium cyanamide and more particularly to a new and improved method whereby a fertilizer product, having numerous advantages over prior products of a similar nature, is obtained.

Crude calcium cyanamide has been known for a long time as a fertilizer material and has been used very extensively. However, it suffers from a number of disadvantages, particularly in that it has a tendency to dust and such dust is corrosive in character. If the dust comes in contact with growing vegetation, such as leaves, it has a tendency to burn the same. If it comes in contact with one who is handling the material, it causes skin lesions and otherwise is disagreeable by getting into the eyes and nostrils. Many attempts have been made in the past twenty or twenty-five years to overcome these difficulties and it has become customary to hydrate the cyanamide and oil the same in order to first remove to some extent the caustic properties thereof, and second, to minimize dust formation. However, this procedure did not accomplish the desired result as the final product was still caustic because of the presence of calcium hydroxide, and it was very dusty because the process of hydrating caused subdivision of the particles into extremely fine sizes, sometimes as high as 1000 mesh.

In order to overcome these disadvantages it had been proposed to granulate the calcium cyanamide in various ways. In fact, we find that from the introduction of the practical use of cyanamide as a fertilizer attempts have been made from time to time to granulate the material for fertilizer purposes.

Among the processes previously attempted for granulating the cyanamide was one which involved the addition to crude calcium cyanamide of from 15% to 50% of a solution of nitric acid containing from 3% to 25% of HNO₃. The solution was added to the cyanamide and the temperature of the reacting mass was regulated, after which the mass was allowed to stand for some time to dry and the lumps crushed to suitable size for use. This process did not produce a successful granulated product as the content of less effective forms of nitrogen were excessive and the product was not stable. It continued to react in storage to give still greater quantities of such forms of nitrogen and after a time the granules again began to show dusting.

Another proposed process consisted in hydrating crude cyanamide with a solution of potassium silicate in water instead of with water alone. The silicate was added at the hydrating stage so that the temperature of the material was raised to a considerable degree and the mixture was thereafter passed through a hot air drier to form lumps of granulated cyanamide, which were then broken up by suitable crushing, which resulted in a large amount of fines. The product obtained in this manner was fairly permanent in that it did not quickly change back to a powder but by reason of the character of the binder, the amount of water used and the conditions of the process, an abnormal amount of dicyandiamide and similar products was formed. In fact, the dicyandiamide formation aws so great that the product never became a successful fertilizer.

In another proposed process crude cyanamide was treated with from 15% to 20% of water, the amount thereof being sufficient to form a pasty mixture and said mixture was compressed in rotating molds to form granules. The wet granules were exposed to the air for a few hours, whereby they became hardened and thereafter were spread in thin layers so that the heat produced in the resulting reaction did not cause too high a rise in temperature and corresponding loss of nitrogen. The material was allowed to remain for several days until no further reaction took place. The process was such as to favor decomposition of cyanamide into the undesirable forms of nitrogen and particularly the long exposure of the wet material to such conditions as to favor high temperatures was an important factor in producing a very high dicyandiamide content. Also on standing the product continued to deteriorate.

In still another proposed process crude cyanamide was treated continuously in a heated cylinder with water or with dilute nitric acid in an amount equal to about 25% of the weight of the cyanamide. Thereafter the material was transferred to a heated rotating cylinder which was intended to cause granulation and simultaneous drying of the granules. This process was also unsuccessful for a number of reasons. The hydration being conducted with a large excess of water and under conditions of heat caused the formation of large amounts of dicyandiamide, and then the further treatment of granulating and drying at a high temperature also favored the formation of more dicyandiamide. By reason of the drying taking place simultaneously with the granulating, a large proportion of the material was produced in dust form and such material could not be used as a granular product.

It has been well known that dicyandiamide is not a suitable or readily available form of nitrogen and the presence of material amounts thereof in a fertilizer decreases the marketability and utility thereof. Therefore the products obtained by prior art process were not desirable commercial products.

I have made a long and extensive study of the problems involved in granulating cyanamide and have reached a number of conclusions upon which I have based my present process. It is known that water, high temperature and alkaline conditions favor the production of dicyandiamide and furthermore the same conditions over longer period of time cause the transformation of the dicyandiamide to still more undesirable forms of nitrogen, such as cyanurea, which is known to be poisonous to plant life. In the processes previously attempted the conditions were such that not only would large amounts of dicyandiamide be formed, but such dicyandiamide was readily transformable into the more poisonous forms of nitrogen.

My process may be briefly outlined as follows:—

1. Crude calcium cyanamide containing say 24% of nitrogen is hydrated with the minimum amount of water necessary and under such conditions as to completely change all of the caustic lime into calcium hydroxide and to decompose the carbide present. No substantial excess of water is used, except that some excess is necessary to replace water lost by evaporation and mechanically.

2. The hydrating operation is to be carried on under conditions to insure as high a temperature as possible in order to quickly cause the desired reactions to take place.

3. The hydrated cyanamide is then allowed to cool and preferably such cooling should be to atmospheric temperatures.

4. The cool, hydrated cyanamide is then moistened with an amount of a binder in water solution sufficient to make a moist powder. The amount of water is preferably such that the binder is in saturated or nearly saturated solution so that there is a minimum excess of water present to cause solution of lime or calcium cyanamide.

5. The moist powder is then disintegrated in a suitable mill to break up the lumps which form in the previous operation.

6. The moist cyanamide is then granulated in a substantially horizontal rotating cylinder at atmospheric temperature.

7. The granulated material is then screened to remove oversize particles, such particles being returned to the disintegrator.

8. The granulated screened material is dried quickly in a special drier which effectively removes water from the granules in the minimum of time, at a temperature which should not exceed the temperature of decomposition of any of the nitrogenous materials in the granules.

9. The water content of the granular material is brought down to a minimum amount not over 5% and generally less than 1%. Thereafter drying or heating may be continued if desired without deleterious effects.

In the accompanying drawings constituting a part hereof,

Fig. 2 is a plan view, diagrammatic in character, showing a simple plant arrangement for operating my process.

Figure 1:
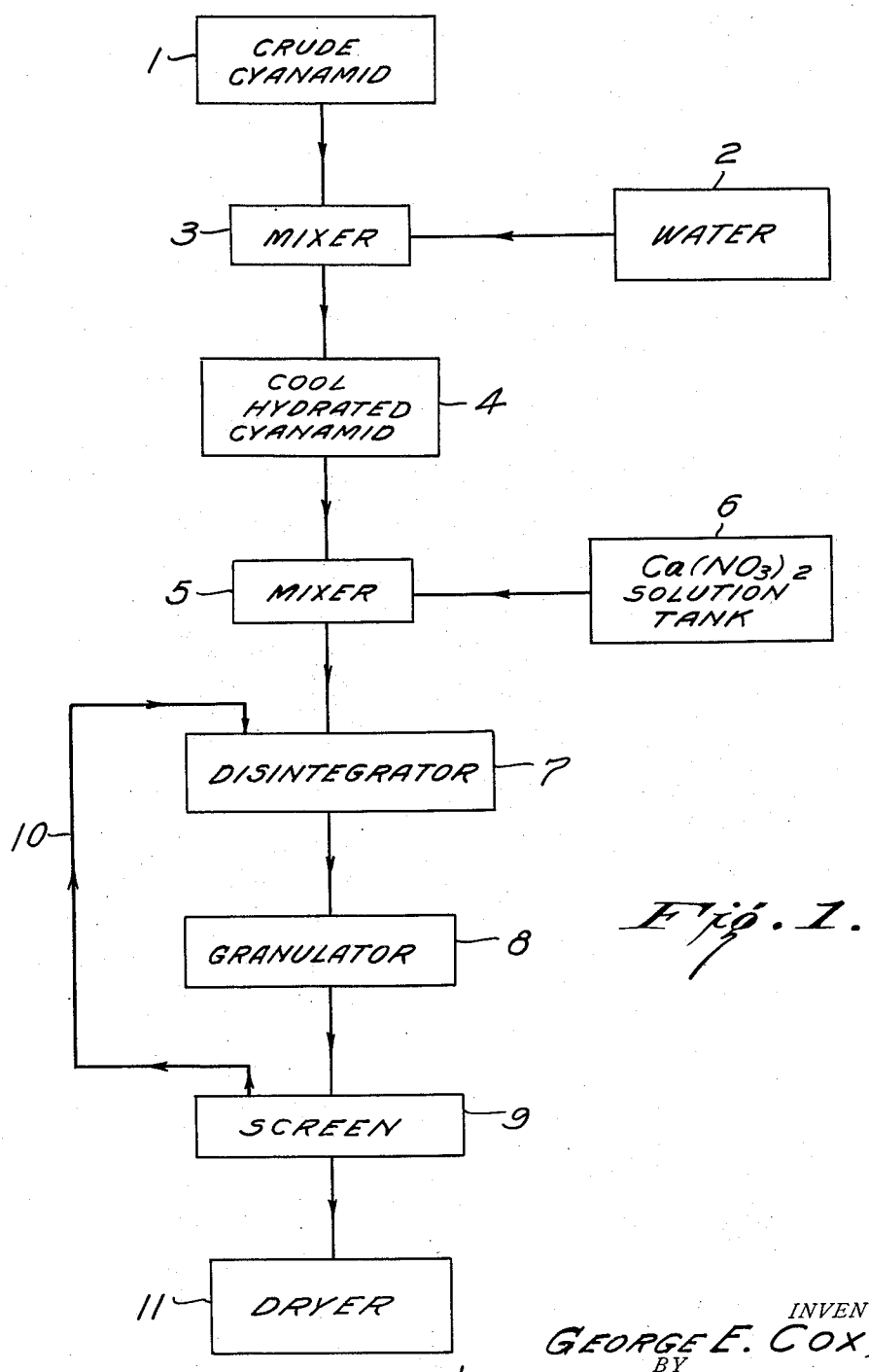
Fig. 1 is a flow sheet showing the essential steps of my process.

As shown in Fig. 1, the crude calcium cyanamide 1 is placed in a mixing device 3 with water 2 and there tumbled until the hydration is complete. The material is then cooled 4 after which it is placed in a mixer 5. A solution 6 of a suitable binder, specifically calcium nitrate, in approximately 50% solution is intimately mixed therewith. In the mixing operation care should be taken that the solution is as uniformly distributed over the entire mass of material as possible, in order to minimize the formation of wet lumps and to facilitate the later granulation step. The formation of lumps cannot be avoided at this point and, therefore, the moist material from the mixer is fed into a disintegrator 7. This may be any suitable type of mill, but I have found that a modified hammer mill is particularly effective in breaking down the lumps to the proper size.

The material is then passed into a granulator 8 whereby with tumbling at approximately atmospheric temperatures, the material is agglomerated into particles of the desired size. I usually prefer to so proportion the amount of solution and the character of the granulating operation that the bulk of the granules formed range from 8 mesh to 100 mesh. The granulated product is then passed over a screen 9 to remove particles larger than 8 mesh, which particles 10 are returned to the disintegrator 7. The granules are passed through a rotary drier 11 and subjected to the action of hot gases, which may be passed either in the same direction as the material or countercurrent thereto. The manner in which the hot gases pass in relation to the granules is not of great importance but it is essential that the drier be so designed as to remove all the water possible in the minimum of time.

There are certain features of my process which are of importance, the first of them being the use of the minimum amount of water necessary for hydrating and this I have found to be from 3% to 6%, provided the cyanamide is of a high grade containing say 24% nitrogen and approximately 18% of free lime.

The cooling of the hydrated material is highly desirable but is not absolutely essential as it is possible to conduct the next stage of the operation with a warm material if suitable precautions are taken in the subsequent steps.

The calcium nitrate solution is ordinarily used in an amount equal to 10% to 12% of calcium nitrate with an equal amount of water based on the hydrated cyanamide used. I may use smaller amounts and I have successfully used as high as 50% of calcium nitrate based on the cyanamide. It is not at all essential that the binder be calcium nitrate as other binders may be found suitable. However, it is essential that the minimum amount of water be used with the binder and to that end I prefer to have a concentrated solution thereof. This avoids solution of the hydrated lime and cyanamide and avoids dicyandiamide formation.

The step of disintegrating is of some importance in that I have found that if large lumps are allowed to pass through the drier, such lumps are high in dicyandiamide. Furthermore, if such lumps pass through the granulator they tend to build up still larger lumps and therefore a large proportion of the material may be in unusable form.

It is of some importance that the large lumps be screened from the bulk of the material before the same passes into the drier. Such screening avoids subsequent dicyandiamide formation and the lumps may be returned to the disintegrator without loss, whereas had they passed through the drier they could not be re-used because of the dicyandiamide content thereof.

Referring to Fig. 2 of the drawings, the apparatus consists essentially of a storage bin 12 for hydrated cooled cyanamide from which a screw conveyer 13 feeds the same into a rotating cylinder paddle mixer 14. A solution of calcium nitrate or other suitable binder in tank 15 is passed through pipe 16 and into the mixer 14 where it is distributed on the material as it passes through in a fine spray to give thorough and uniform incorporation thereof. From the exit end 17 of the mixer, the material passes into a disintegrator 18 and from there into the granulator 19. This is a slightly inclined open cylinder rotating at a suitable rate of speed so that the material passes therethrough in a comparatively short time. I find with my preferred mixture that approximately forty-five minutes is ample time for complete granulation of the product.

From the discharge end 20 thereof the material drops onto a belt conveyer 21 and onto a vibrating screen 22 where the oversized particles are removed and the granules pass on belt 23 into the rotary drier 24. The oversized particles from screen 22 may be returned to disintegrator 18 by a belt (not shown) or any other suitable means. Hot gases of combustion are produced in a furnace 25 passing through a hot air flue 26 and into the interior of the rotary drier 24 out of contact with the granules being dried. The gases pass through the length of the drier to the discharge end 27, from which point they are returned through the several compartments in the drier which contain the granules, so that there is direct contact of hot gases and material. The exhaust gases pass out through flue 28.

I have found that the temperature of the granules in the drier may be varied within wide limits and still give the desired results of quick drying and elimination of most of the water. Although I prefer for control purposes and for reasons of economy to heat the granules in the drier until their maximum temperature is from 100° to 115° C., I have found that even if the maximum temperature is as low as 70° C., good drying can be obtained, and I have also found that a maximum temperature of the granules as high as 300° C. will give good results without undue losses. The essential thing is to as quickly as practicable reduce the water content to below 5% in all cases, and preferably to below 1%. In actual practice I find no difficulty in keeping the water content of the finished product between .2% and 1%.

In the hydrating step with the particular cyanamide I have experimented with, I find from 3% to 6% of water gives the best results, but I am not limited to such amounts as I have found that results almost as good can be obtained if the amount of water used varies from 2% to 10%.

As above stated, the binder need not be calcium nitrate as other binders may be used with good results. For example, I have used calcium chloride, sodium nitrate, ammonium nitrate, sugars, starches, urea, glucose, sulphite liquor and other materials in place of the calcium nitrate. When organic materials are used as binders, I believe they combine with the calcium present in the cyanamide to form calcium salts which are the equivalent of the calcium nitrate specifically described herein. When calcium nitrate is used I prefer an amount equal to from 10% to 12% of the cyanamide, but the amount may be varied greatly with good results. For instance, I have used as little as 5% of calcium nitrate and obtained excellent granulation with low dicyandiamide formation. On the other hand, I have used as much as 50% of calcium nitrate with equally good results. However, such large amounts may under some conditions be uneconomical because in many cases calcium nitrate is considerably more expensive than cyanamide. Furthermore, such large amounts of calcium nitrate are not at all essential in producing a desirable commercial product.

Although the drying time should be the minimum in order to prevent dicyandiamide formation, one should not use gases or a heating medium of such high temperature as to cause destruction of the nitrogen content of the granules. In the apparatus which I have used I find that forty-five minutes is usually ample for complete dehydration, and as a matter of precaution I usually use a period of one hour for the drying. After the material has been dried, heat may be continuously or intermittently applied for an indefinite time without causing deterioration of the product. The time of actual drying may be increased and I have found that even though the water content of the granules is eliminated over a period as long as three hours, the dicyandiamide formation is not so serious as to cause any concern. My copending application Serial No. 607,790, filed of even date herewith, describes and claims a novel granular cyanamide product which may be prepared by the above described processes.

Although I have described my invention setting forth a single embodiment thereof, it is obvious that my process may be varied to a considerable degree in many respects without departing from the scope and spirit of the invention. For example, the temperature and other conditions of the hydration stage may be changed, the amounts and character of the binder may be varied, and details of mechanical manipulation of the materials as they pass through the process are susceptible of wide variation as will be apparent to those skilled in the art. My invention is, therefore, not to be limited to the details above described, but is to be considered as broad and as limited only by the scope of the claims appended hereto.

I claim:

1. A method of granulating calcium cyanamide which comprises the steps of completely hydrating said cyanamide, cooling the same, treating the same with a solution of an alkaline metal salt, granulating the mixture and quickly drying the granules until the free water content thereof is below 5%.

2. A method of granulating calcium cyanamide which comprises the steps of completely hydrating said cyanamide, cooling the same, treating the same with a solution of an alkaline metal salt, granulating the mixture and quickly drying the granules until the free water content thereof is below 1%.

3. A method of granulating calcium cyanamide which comprises the steps of completely hydrating said cyanamide, cooling the same, treating the same with a solution of an alkaline metal salt, granulating the mixture and quickly drying the granules until the free water content thereof is about .2% to 1%.

4. A method of granulating calcium cyanamide which comprises the steps of completely hydrating said cyanamide, cooling the same, treating the same with a solution of an alkaline metal salt, granulating the mixture and quickly drying the granules at a maximum temperature of 70°–300° C. until the free water content thereof is below 5%.

5. A method of granulating calcium cyanamide which comprises the steps of completely hydrating said cyanamide, cooling the same, treating the same with a solution of an alkaline metal salt, granulating the mixture and quickly drying the granules at a maximum temperature of 100°–115° C. until the free water content thereof is below 5%.

6. A method of granulating calcium cyanamide which comprises the steps of completely hydrating said cyanamide with from 2% to 10% of water, cooling the same, treating the same with a solution of an alkaline metal salt, granulating the mixture and quickly drying the granules until the free water content thereof is below 5%.

7. A method of granulating calcium cyanamide which comprises the steps of completely hydrating said cyanamide with from 3% to 6% of water, cooling the same, treating the same with a solution of an alkaline metal salt, granulating the mixture and quickly drying the granules until the free water content thereof is below 5%.

8. A method of granulating calcium cyanamide which comprises the steps of completely hydrating said cyanamide, cooling the same to approximately room temperature, treating the same with a solution of an alkaline metal salt, granulating the mixture and quickly drying the granules until the free water content thereof is below 5%.

9. A method of granulating calcium cyanamide which comprises the steps of completely hydrating said cyanamide, cooling the same, treating the same with a solution of an alkaline earth metal salt, granulating the mixture, and quickly drying the granules until the free water content thereof is below 5%.

10. A method of granulating calcium cyanamide which comprises the steps of completely hydrating said cyanamide, cooling the same, treating the same with a solution of calcium nitrate, granulating the mixture and quickly drying the granules until the free water content thereof is below 5%.

11. A method of granulating calcium cyanamide which comprises the steps of completely hydrating said cyanamide, cooling the same, treating the same with a solution of calcium nitrate in an amount equal to 5% to 50% of the cyanamide, granulating the mixture and quickly drying the granules until the free water content thereof is below 5%.

12. A method of granulating calcium cyanamide which comprises the steps of completely hydrating said cyanamide, cooling the same, treating the same with a solution of calcium nitrate in an amount equal to 5% to 50% of the cyanamide, said nitrate being in approximately a 50% solution in water, granulating the mixture and quickly drying to granules until the free water content thereof is below 5%.

13. A method of granulating calcium cyanamide which comprises the steps of completely hydrating said cyanamide, cooling the same, treating the same with a solution of calcium nitrate in an amount equal to 10% to 12% of the cyanamide, granulating the mixture, and quickly drying the granules until the free water content thereof is below 5%.

14. A method of granulating calcium cyanamide which comprises the steps of completely hydrating said cyanamide, cooling the same, treating the same with a solution of calcium nitrate in an amount equal to 10% to 12% of the cyanamide, said nitrate being in approximately a 50% solution in water, granulating the mixture and quickly drying the granules until the free water content thereof is below 5%.

15. A method of granulating calcium cyanamide which comprises the steps of completely hydrating said cyanamide, cooling the same, treating the same with a solution of an alkaline metal salt, the total amount of water added being sufficient to produce a moist powder, granulating the mixture and quickly drying the granules until the free water content thereof is below 5%.

16. A method of granulating calcium cyanamide which comprises the steps of completely hydrating said cyanamide with from 2% to 10% of water, cooling the same to room temperature, treating the same with a solution of calcium nitrate in an amount equal to 5% to 50% of the cyanamide, said nitrate being in approximately a 50% solution in water, granulating the mixture and quickly drying the granules until the free water content thereof is below 5%.

17. A method of granulating calcium cyanamide which comprises the steps of completely hydrating said cyanamide with from 3% to 6% of water, cooling the same to room temperature, treating the same with a solution of calcium nitrate in an amount equal to 10% to 12% of the cyanamide, said nitrate being in approximately a 50% solution in water, granulating the mixture and quickly drying the granules until the free water content thereof is about .2% to 1%.

18. A method of granulating calcium cyanamide which comprises the steps of completely hydrating said cyanamide, cooling the same, treating the same with a solution of an alkaline metal salt, granulating the mixture and quickly drying the granules until the free water content thereof is below 5%, the time of drying being not over three hours.

19. A method of granulating calcium cyanamide which comprises the steps of completely hydrating said cyanamide, cooling the same, treating the same with a solution of an alkaline metal salt, granulating the mixture and quickly drying the granules until the free water content thereof is below 5%, the time of drying being not over one hour.

20. A method of granulating calcium cyanamide which comprises the steps of completely hydrating said cyanamide, cooling the same, treating the same with a solution of an alkaline metal salt, granulating the mixture and quickly drying the granules until the free water content thereof is below 5%, the time of drying being not over three hours at a maximum temperature of the granules not over 300° C.

21. A method of granulating calcium cyanamide which comprises the steps of completely hydrating said cyanamide, cooling the same, treating the same with a solution of an alkaline metal salt, granulating the mixture and quickly drying the granules until the free water content thereof is below 5%, the time of drying being not over one hour at a maximum temperature of the granules not over 300° C.

22. A method of granulating calcium cyanamide, which comprises the steps of completely hydrating said cyanamide, cooling the same, treating the same with a concentrated solution of an alkaline metal salt, granulating the mixture and quickly drying the granules until the free water content thereof is below 5%.

23. A method of granulating calcium cyanamide which comprises the steps of completely hydrating said cyanamide, cooling the same, treating the same with a concentrated solution of calcium nitrate, granulating the mixture and quickly drying the granules until the free water content thereof is below 5%.

24. A method of granulating calcium cyanamide which comprises the steps of completely hydrating said cyanamide with an amount of water sufficient to completely hydrate free lime and decompose carbide but with no substantial excess, cooling the same, treating the same with a solution of an alkaline metal salt, granulating the mixture and quickly drying the granules until the free water content thereof is below 5%.

25. A method of granulating calcium cyanamide which comprises the steps of completely hydrating said cyanamide with an amount of water sufficient to completely hydrate free lime and decompose carbide but with no substantial excess, cooling the same, treating the same with a solution of an alkaline metal salt, granulating the mixture and quickly drying the granules until the free water content thereof is below 1%.

26. A method of granulating calcium cyanamide which comprises the steps of completely hydrating said cyanamide, cooling the same, treating the same with a solution of an alkaline metal salt, disintegrating the mixture, granulating the mixture and quickly drying the granules until the free water content thereof is below 5%.

27. A method of granulating calcium cyanamide which comprises the steps of completely hydrating said cyanamide, cooling the same, treating the same with a solution of an alkaline metal salt, disintegrating the mixture, granulating the mixture and quickly drying the granules until the free water content thereof is below 1%.

28. A method of granulating calcium cyanamide which comprises the steps of completely hydrating said cyanamide, cooling the same, treating the same with a solution of an alkaline metal salt, disintegrating the mixture, granulating the mixture, screening out lump material, and quickly drying the granules until the free water content thereof is below 5%.

29. A method of granulating calcium cyanamide which comprises the steps of completely hydrating said cyanamide, cooling the same, treating the same with a solution of an alkaline metal salt, disintegrating the mixture, granulating the mixture, screening out lump material, and quickly drying the granules until the free water content thereof is below 1%.

30. A method of granulating calcium cyanamide which comprises the steps of completely hydrating said cyanamide, cooling the same, treating the same with a solution of an alkaline metal salt, disintegrating the mixture, granulating the mixture, screening out lump material, quickly drying the granules until the free water content thereof is below 5%, and returning said lump material to the disintegrating step.

31. A method of granulating calcium cyanamide which comprises the steps of completely hydrating said cyanamide, cooling the same, treating the same with a solution of an alkaline metal salt, disintegrating the mixture, granulating the mixture, screening out lump material, quickly drying the granules until the free water content thereof is below 1%, and returning said lump material to the disintegrating step.

32. A method of granulating calcium cyanamide which comprises the steps of completely hydrating said cyanamide, cooling the same, treating the same with a solution of an alkaline metal salt, granulating the mixture, and quickly drying the granules until the free water content thereof is below 5%, the treating with solution and granulating being conducted at atmospheric temperatures.

GEORGE E. COX.